United States Patent Office 3,182,034
Patented May 4, 1965

3,182,034
VINYL CHLORIDE RESINS PLASTICIZED WITH MIXED ESTERS OF SATURATED POLYHYDRIC ALCOHOLS ESTERIFIED WITH NAPHTHENIC ACID AND EPOXIDIZED FATTY ACIDS
John O. Van Hook, Abington, Pa., assignor to Rohm & Haas Company, Philadelphia, Pa., a corporation of Delaware
No Drawing. Filed June 4, 1962, Ser. No. 199,601
6 Claims. (Cl. 260—30.4)

This invention relates to mixed esters in which the acid radical is a mixture of naphthenic and aliphatic monocarboxylic acids and the alcohol radical is that of a polyhydric alcohol containing 2 to 3 hydroxy groups.

This application is a continuation-in-part of application Serial No. 849,149, filed October 28, 1959, and now abandoned.

In the constant search for novel plasticizers capable of satisfying the modern and exacting conditions to which resinous plasticized compositions are subjected, attempts have been made to plasticize polyvinyl chloride resins with ethylene bis-naphthenate derived from naphthenic acids containing 15 carbon atoms or more. The resulting resin was stiff, brittle, oily and opaque, no significant plasticization being obtained. Substitution of the ethylene glycol in this ester by glycerol still gives a resin which is also quite unsatisfactory for even the most common practical applications.

Also, United States Patent No. 2,017,070 to Lazier proposed octadecanediol dinaphthenates for cellulose derivatives, such as cellulose nitrate. United States Patent No. 2,438,753 to Kellog proposed naphthenic acid esters for plasticization of synthetic rubber resins. None of these are adequate for the plasticization of polyvinyl chloride resins. United States Patent No. 2,891,089 to Jolly proposed mixed esters of polyhydric alcohols, in which at least one acid radical in the ester molecule is derived from naphthenic acids, whereas the other acid radical is derived from a aliphatic monocarboxylic acid. The naphthenic acid fraction is of relatively high molecular weight, its saponification number being within the range of 120 to 200 mg. of potassium hydroxide per gram, this value corresponding to an equivalent weight of 280 to 467; the hydrocarbon radical in the aliphatic monocarboxylic acid fraction has less than 4 carbon atoms. These mixed esters are only effective as secondary plasticizers for polyvinyl chloride wherein they must be used in conjunction with a conventional primary plasticizer, such as di(2-ethylhexyl)phthalate. Accordingly, there is a need for a mixed ester of naphthenic acids and polyhydric alcohols, which is a satisfactory primary plasticizer for polyvinyl chloride resins.

In accordance with this invention, the mixed esters of the invention impart to polyvinyl halide resins excellent plasticization, yielding clear and supple films which exhibit a high degree of stability at elevated temperatures and which impart to the resins good general plasticization properties.

The mixed esters of this invention comprise mixed esters of polyhydric alcohols which may be represented by (Formula I)

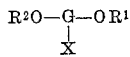

in which X is selected from the group consisting of $OR^3$ and a hydrogen atom, G is a residue of a polyhydric alcohol which has from 2 to 3 hydroxyl groups, and $R^1$, $R^2$ and $R^3$ are each selected from the group consisting of naphthenic acid residues and aliphatic monocarboxylic acid residues; when G is a dihydric alcohol residue, X is a hydrogen atom; the mixed esters themselves form a mixed ester composition in which the naphthenic acid residue is present in an amount of from 80 mole percent to 20 mole percent, with the balance or remainder of the total acid residue being the aliphatic monocarboxylic acid residue which is present in an amount of from 20 mole percent to 80 mole percent. Stated otherwise, the naphthenic acid and aliphatic monocarboxylic acid residues are present in the mole ratio of between 1 to 4 and 4 to 1. An especially favored group includes the mixed polyhydric alcohol esters in which the aliphatic monocarboxylic acid residue is epoxidized. Another favored group is that in which G represents a glycol or a triol in which at least two of the hydroxyl groups are bonded onto non-vicinal carbon atoms. For best results, the mixed naphthenates have a molecular weight in the range of 300 to about 500, and especially to about 480, when G is a dihydric alcohol residue, and in the range of 300 to about 750, and especially to about 700, when G is a trihydric alcohol residue.

The polyhydric alcohols, of which G represents the residue, are dihydric and trihydric alcohols; these alcohols are preferably acyclic and saturated; they may be branched or straight chain alcohols; the alcohols may be ether alcohols. Typical illustrative dihydric alcohols include those represented by the formula $HO(CH_2)_nOH$, where $n$ is an integer within the range of 2 to 10, such as ethylene glycol; trimethylene glycol; tetramethylene glycol; pentamethylene glycol; hexamethylene glycol; heptamethylene glycol; octamethylene glycol; nonmethylene glycol; and decamethylene glycol; other suitable alcohols include branched chain glycols like 2-methyl-2-amylpropanediol-1,3;
2-methyl-2-nonylpropanediol-1,3;
2-methyl-2-laurylpropanediol-1,3;
2-ethyl-2-butylpropanediol-1,3;
2-ethyl-2-heptylpropanediol-1,3;
2-ethyl-2-decylpropanediol-1,3;
2,2-dipropylpropanediol-1,3;
2,2-dibutylpropanediol-1,3;
2,2-diamylpropanediol-1,3;
2,2-dioctylpropanediol-1,3;
2,2-didecylpropanediol-1,3;
2-methyl-2-amylpropanediol-1,3;
2-ethyl-1,8-octanediol; 3-ethyl-1,10-decanediol;
3,6-diethyl-1,8-octanediol;
4,7-diethyl-2,9-decanediol;
4-ethyl-2,11-dodecanediol;
3,13-tetradecanediol;
1,2-propanediol;
2-ethyl-1,3-pentanediol;
2,4-dimethyl-1,3-pentanediol;
2,2-diethyl-1,3-propanediol;
2-isopropyl-2-methyl-1,3-propanediol;
2-isobutyl-2-methyl-1,3-propanediol;
2-tert-butyl-2-methyl-1,3-propanediol;
2-ethyl-2-isopropyl-1,3-propanediol;
2-ethyl-1,3-hexanediol;
2-isopropyl-1,3-pentanediol;
2-ethyl-4-methyl-1,3-pentanediol;
2,5-dimethyl-1,3-hexanediol;
2-methyl-1,3-octanediol;
2-ethyl-1,3-heptanediol;
2-isopropyl-1,3-hexanediol;
2-ethyl-2-tert-butyl-1,3-propanediol;
2-methyl-2-neopentyl-1,3-propanediol;
2-amyl-2-ethyl-1,3-propanediol;
2-tert-butyl-2-isopropyl-1,3-propanediol;
2-isopropyl-4,4'-dimethyl-1,3-pentanediol; and
2-hexyl-2-methyl-1,3-propanediol;

and trihydric alcohols typified by glycerol; trimethylolpropane; trimethylol ethane;

2-methylol-2-hexylpropanediol-1,3;
2-methylol-2-decylpropanediol-1,3;
2-methylol-2-phenylpropanediol-1,3;
2-ethylol-2-butylpropanediol-1,3;
2-ethyl-2-heptylpropanediol-1,3;
diethylene glycol;
dipropylene glycol;
triethylene glycol;

and other ether alcohols; and the like.

Alcohols in which G represents a hydrocarbon residue or an ether residue are preferred. Mixtures of various dihydric and of various trihydric alcohols, as well as mixtures of dihydric alcohols with the latter, may be employed. When the glycols or triols possess at least 1 carbon atom intermediate the hydroxyl groups, i.e., when at least 2 of the hydroxyl groups are not linked onto vicinal carbon atoms, there is a further unexpected enhancement of the plasticization properties. For these reasons, the mixed esters derived from this class of polyols are especially favored.

The aliphatic monocarboxylic acid residues which $R^1$ and $R^2$ represent when G is a dihydric alcohol and which $R^3$ also represents when G is a trihydric alcohol, are acids which preferably contain an average of 6 of 10 carbon atoms, their individual carbon content generally not exceeding 18 carbon atoms.

When $R^{1-3}$ represent alkenyl or epoxidized acid residue group, the carbon atom content may range from 1 to 24. Particularly suitable are epoxidized fatty acids in which case the average carbon atom content is 12 to 24. These form a preferred group. An especially desirable group is the mixed ether-esters in which G represents an ether residue and $R^{1-3}$ represent an epoxidized acid residue. The acids may be straight or branched; they may be saturated or ethylenically unsaturated, in the latter case the ethylenic unsaturation may be taken up in parts or in toto with epoxides or equivalent groups. A single saturated aliphatic monocarboxylic acid or a blend of saturated aliphatic carboxylic acids may be used in mixtures with the naphthenic acids in the molar proportions specified above. Typical acids include the following: caproic, caprylic, capric, isocaproic, 2-methylpentanoic, 3-methylpentanoic, 2-ethylhexanoic isodecanoic, 3-ethylpentanoic, 3-methylpentanoic, 2,2-dimethylbutyric, 2,2-dimethylpropionic, 3,3-dimethylbutyric, 2-methyl - 3 - ethylpentanoic, 2-isopropylpentanoic, 2,2-dimethyl-3-methylhexanoic, 2 - isopropyl-3-methylbutyric, triethylacetic, stearic, palmitoleic, oleic, linoleic, linolenic, parinaric, and the corresponding epoxy acids in which the epoxy groups take up all or part of the ethylenic unsaturation. The saturated acids are preferred and this term includes the acids substantially saturated with epoxy groups, the term "substantially" referring to the fact that at least 80 mole percent is preferably saturated with epoxides.

The suitable naphthenic acids that are used, in accordance with the invention, in mixtures with the acids described above, may contain an average of 8 to 30 carbon atoms, including fractional values for carbon atoms in that range. The preferred naphthenic acids contain from 10 to 16 carbon atoms, this carbon content corresponding to an equivalent weight ranging from 168 to 250. The useful naphthenic acids, which are primarily materials for the preparation of the mixed esters of the present invention, are generally mixtures of naphthenic acids which are extraction products of crude petroleum oils of varying degree of purity. The naphthenic acid mixtures comprise predominantly monocyclic acids, the major portion of which contain 8 to 12 carbon atoms and a minor proportion of polycyclic acids generally containing an average of 12 to about 26 carbon atoms.

The suitable naphthenic acids and the aliphatic monocarboxylic acids are employed in such proportions to give a mixed ester composition in which the acid residue is a mixture of 80 to 20 mole percent of naphthenic acid residue and 20 to 80 mole percent of saturated or unsaturated aliphatic monocarboxylic acid residues. The specific mole ratio of the two types of acid residues in conjunction with the particular type of alcohols apparently bring about a coaction or interdependence that is responsible for the valuable properties of these compounds as plasticizers for polyvinyl halide resins.

The preparation of the mixed esters of the invention may be carried out by esterifying a suitable naphthenic acid with the desired polyol under conditions favoring esterification in the optional presence of an esterification catalyst. A water entrainer may be employed, if desired. The reaction temperatures preferably range from about 100° to 300° C. and after the theoretical amount of water has distilled off, the glycol ester is collected. If desired, a purer product may be obtained by washing with dilute alkali. Typical operable esterification catalysts include organic and inorganic acids, such as toluenesulfonic acid, benzenesulfonic acid, alkane sulfonic acid, alkali metal hydrogen sulfate, hydrochloric acid, sulfuric acid, Lewis acids, such as zinc chloride, metallic zinc, boron fluoride, and the like. Typical water-entrainers that may be used include hydrocarbons, like toluene, xylene, heptane, octane, kerosene, mixed aliphatic, aromatic, and cyclic solvents, such as mineral oil, and the like.

Depending upon the nature of the acid, it may sometimes be preferable to modify a naphthenate ester with a suitable acid by reacting the ester and the desired acid to the extent necessary to change the acid moiety of the ester till it conforms with the molar proportions of naphthenic acids and other acids to the extent specified above.

In the case where it is desired to epoxidize in part or in toto the ethylenic unsaturation of the ethylenically unsaturated aliphatic monocarboxylic acid, which may be used in conjunction with the naphthenic acid to form the acid moiety of the mixed ester, it is generally advisable to post-epoxidize the mixed ester. This is effectuated by contacting at a temperature in the range of about 25° to about 50° C. a mixed ester containing ethylenic unsaturation in its acid moiety with a peracid, such as perbenzoic, peracetic, and the like. Generally, these peracids are used in a suitable solvent such as chloroform, acetic acid, ethyl acetate, and the like. Instead of using a peracid, an in situ method may be used wherein mixtures of hydrogen peroxide and the lower fatty acids, such as acetic acid, are employed. In the epoxidation, the amount of peracid ranges from about 1.0 to about 1.5 mole of acid per mole of ethylenic unsaturation in the mixed ester. When the epoxidation is substantially completed, the reaction mixture is separated into an aqueous and an organic phase, the epoxidized mixed naphthenate being isolated from the latter phase by conventional methods.

The resulting naphthenates are oily liquids generally of a pale yellow or amber color.

Typical mixed esters of the invention include the following:

4-(2-methylvaleryloxy) butyl naphthenate
Naphthenyloxy butyl 9,10-epoxystearate
Naphthenyloxy propyl 9,10-epoxystearate
Naphthenyloxy propyl 9,10,12,13-diepoxystearate
Naphthenyloxy pentyl 9,10-epoxystearate
3-capryloxy propyl naphthenate
2-naphthenyloxy methyl-2-heptamoyloxy methyl propyl 9,10-epoxystearate
2-(2-ethylbutyryloxymethyl)-2-methyl propyl naphthenate
2,2-di(capryloxymethyl)butyl naphthenate
2-heptaneyloxyhexyl naphthenate
2,2-diethyl-3-(methylvaleryloxy)propyl naphthenate
2-ethylbutyryloxy naphthenate The mixed esters of this invention are useful as lubricants and as additives thereto. They are especially valuable plasticizers for polyvinyl halide resins. The term "polyvinyl halide resin" refers to polymers containing a predominant quantity, that is, a quantity greater than 50%, generally over 60%, by weight of the monomer as vinyl halide units. This includes the homopolymers of the vinyl halides as well as the copolymers and interpolymers prepared therefrom with one or more other copolymerizable mono-olefinic monomers. Such copolymerizable secondary monomers include those containing a vinylidene group such as the vinylidene halides like vinylidene chloride; the monomers like the vinyl esters of carboxylic acids, for example, vinyl acetate, vinyl propionate, vinyl butyrate, and vinyl benzoate, and the like; unsaturated acids and the corresponding α-alkyl-substituted unsaturated acids, their alkyl amides, and nitriles like alkyl acrylate, methyl acrylate, ethyl acrylate, propyl acrylate, butyl acrylate, acrylamide, acrylonitrile, and the like; vinyl aromatic compounds such as the styrenes, including styrene, chlorostyrene, ethyl styrene, and the like; vinyl naphthalene, alkyl esters of maleic, crotonic, itaconic, fumaric acids and the like; vinyl alkyl ketones, vinyl pyridine, isobutylene and various other copolymerizable mono-olefinic monomers. The vinyl halide polymer preferably employed is polyvinyl chloride or vinyl chloride copolymers which contain only minor proportions of other copolymerized mono-olefinic monomers such as copolymers of 50, and preferably 70 to 99 percent of vinyl chloride and, for example, about 1 to 30 percent of vinylidene chloride, vinyl esters and acrylic acid esters; multi-component interpolymers such as those, for example, containing about 70 to 90 percent vinyl chloride, 5 to 25 percent vinylidene chloride, and 5 to 25 percent vinyl esters such as vinyl acetate, vinyl benzoate and alkyl acrylates or alkyl methacrylates.

In the compounding of the polyvinyl halide resins of this invention, the mixed esters are ordinarily incorporated into the vinyl halide polymers by mixing the powdered resin with the liquid plasticizer followed by mixing and/or kneading and then by curing the mix at an elevated temperature, for example, within the range from 150° to 200° C., on hot rolls or in a heated mixer, such as a Werner-Pfleiderer or Banbury mixer. The proportion of mixed esters that may be employed may vary over a great range since it is dependent on the particular esters of this invention, the specific polyvinyl halide resin to be plasticized, and the final degree of plasticization desired in the resin, this factor in itself being dependent on the ultimate application intended for the resin. With these facts in mind, one skilled in the art may use the mixed esters of this invention in a "plasticizing amount," for most purposes this being from about 5 to 100 parts, and more commonly from 20 to 60 parts, of mixed esters per 100 parts of resin. In amounts exceeding 100 parts of naphthenate per 100 parts of polyvinyl chlroide resin, the esters of the invention are more commonly suitable for use in organosols and plastisols where some of the more fluid mixed esters of the invention are useful in imparting the necessary fluidity for preparing semi-rigid polyvinyl chloride coatings.

With the polyvinyl halide resin, there may be incorporated other plasticizers, various stabilizers, fillers, dyes, pigments, and the like.

The following examples illustrate the preparation of typical mixed esters of this invention; all parts are by weight. Color of the product is measured on the Gardner 1933 scale and the viscosity is determined on the Gardner-Holdt scale. The "deoiled" equivalent weight to which reference is made in the examples is the equivalent weight of the naphthenic acids free of neutral oils which the acids normally contain in a 5% to about 10% by weight.

EXAMPLE 1

(a) A mixture of 22.5 parts (0.25 mole) of tetramethylene glycol, 71 parts (0.25 mole) of naphthenic acid (deoiled eq. wt. 281), 35 parts (0.3 mole) 2-methylpentanoic acid, 0.15 part of zinc dust, and 25 parts of xylene is stirred and heated under an atmosphere of nitrogen at 163° to 245° C. for 17 hours while 18.5 parts of water is removed by azeotropic distillation and separated. The reaction mixture is cooled, washed with dilute nitric acid and water and distilled under reduced pressure. The fraction that boils at 187° to 232° C. at 0.30 mm. is washed with dilute alkali and redistilled to give 63.5 parts of product, which is 4-(2-methylvaleryloxy)butyl naphthenate. The product boils at 212°–213° C. (0.30 mm.), has an $n_D^{25}$ of 1.4864, a saponification number of 265; its molecular weight is 390±6. The product, 4-(2-methylvaleryloxy)butyl naphthenate, gives a soft, pliable, and well plasticized film with a polyvinyl chloride-polyvinyl acetate copolymer (87 percent of vinyl chloride for 13 percent of vinyl acetate) in a proportion of 40 parts of plasticizer for 60 parts of resin.

(b) Likewise, following the same procedure, 4-isocapryloxy butyl naphthenate is prepared from tetramethylene glycol and a mixture of naphthenic and isocaprylic acids. The compound plasticizes polyvinyl chloride to a clear, supple film.

EXAMPLE 2

A mixture of 90 parts (1.0 mole) of 1,3-butanediol, 284 parts (1.0 mole) naphthenic acid (deoiled eq. wt. 266), 0.2 part zinc dust, 50 parts of xylene, and 123 parts of 2-ethylbutyric acid is stirred and heated under an atmosphere of nitrogen at pot temperature of 189° to 191° C. while 32.0 parts of an aqueous layer are removed by azeotropic distillation and separated. The product is removed from the reaction mixture by distillation under high vacuum; it is 2-ethylbutyryloxy butyl naphthenate. In a cast film with a polymer of polyvinyl chloride polyvinyl acetate, it gives a soft, pliable, and well plasticized film.

EXAMPLE 3

(a) A mixture of 141 parts (0.5 mole) of oleic acid, 114 parts (0.5 mole) naphthenic acid, 91.0 parts (0.7 mole) heptanoic acid, 61 parts (0.5 mole) of trimethylol ethane, 50 parts toluene, and 0.8 part zinc dust is heated at reflux, under nitrogen, under a Dean-Stark trap for 7 hours while 28.9 parts of water are collected. The mixture is cooled, washed with dilute nitric acid and water, and concentrated at a pot temperature of 260° C. (0.3 mm.) to a residual weight of 141 parts. The product is 2-naphthenyloxymethyl-2-heptanoyloxy. It has an iodine number of 38, acid number of 0.8, and a saponification number of 254.

(b) This compound in benzene solution is contacted with 0.3 mole of 40% peracetic acid in acetic acid at 20°–25° C. for 16 hours and then washed with water, dilute caustic, and again with water. The organic layer is concentrated to a pot temperature of 125° C. at 0.5 mm. pressure after which it weighs 129 parts; it has a color of 3+, a viscosity of G—, an $n_D^{25}$ of 1.4670, and gives an analysis of 2.1% oxirane oxygen, the analysis confirming that it is 2-naphthenyloxymethyl-2-heptanoyloxy propyl 9,10-epoxystearate. This compound is very compatible with a vinyl chloride-vinyl acetate copolymer at 40% in a cast film.

(c) By substitution of oleic acid by an equivalent amount of linoleic acid, there is obtained 2-naphthenyloxymethyl - 2 - heptanoyloxymethylpropyl 9,10,12,13 - diepoxystearate. It, too, is useful for the plasticization of polyvinyl chloride.

(d) The corresponding triepoxide is obtained by epoxidizing 2 - naphthenyloxymethyl - 2 - heptanoyloxy linoleneate.

EXAMPLE 4

(a) A mixture of 141 parts (0.5 mole) of oleic acid, 116 parts (0.5 mole) naphthenic acid, 56 parts (0.54 mole) of 1,5-pentanediol, 0.5 part of zinc dust, and 50 parts of toluene is heated at reflux, under nitrogen, under a Dean-Stark trap for 6 hours while 21.5 parts of water are collected in the trap. The residue is cooled, washed with dilute nitric acid and water, and concentrated finally by heating to a pot temperature of 255° C. at 0.3 mm. The residue is naphthenyloxy pentyl oleate; it has an iodine number of 49, an acid number of 2.4, and its saponification number is 191.

(b) There is contacted 173 parts in a benzene solution with 0.45 mole of 40% peracetic acid in acetic acid at 20° to 25° C. for 16 hours and then washed with water, dilute caustic, and again with water. The organic material is concentrated to a pot temperature of 125° C. at 0.5 mm. after which it weighs 160 parts, has a color of 4+, a viscosity of D, an $n_D^{25}$ of 1.4700, and gives an analysis oxirane oxygen of 2.7%, thus confirming the identity of naphthenyloxy pentyl 9,10-epoxystearate. It is very compatible with polyvinyl chloride-vinyl acetate copolymer at 40% in a cast film.

(c) Substitution of .1 mole of oleic acid in part (a) by linoleic acid gives a mixed ester wherein the acid portion is a mixture of mono and diethylenically unsaturated acids, which upon epoxidation give the corresponding epoxide.

(d) Substitution of 1,5-pentanediol by an equivalent portion of diethylene glycol gives the corresponding mixed ether ester which, upon epoxidation, yields the corresponding epoxide. The compound is compatible with polyvinyl chloride-vinyl acetate copolymer in a cast film.

The special value of the mixed esters of the invention as plasticizers for polyvinyl halide resins is illustrated by the following resinous compositions, no intent to limit the scope of the inventions being intended thereby. All parts are by weight.

The resinous compositions are made up by blending the following ingredients in the amounts stated in Table I:

Table I
INGREDIENTS OF THE FORMULATIONS

| | Parts |
|---|---|
| Polyvinyl chloride | 60 |
| Plasticizer | 40 |
| Barium cadmium laurate | 1.0 |

The following typical mixed esters are incorporated into the vinyl halide polymer by the procedure described above and the resulting supple films are subjected to the following standard evaluation tests. For purposes of comparison, samples of polyvinyl halide resins plasticized with di(2-ethylhexylphthalate), a commercially recognized plasticizer, are subjected to the same tests and the results are reported in Table III below.

The tests to which the polyvinyl halide resins are subjected are described below:

TESTS

Test 1.—Shore hardness: A Shore "A" Durometer, under a weight of 3 pounds, is applied to the test specimens. A recording is made at once and after ten seconds and the hardness is expressed by the two values, of which the first recording is the higher.

Test 2.—Torsional modulus at low temperatures: A 2¼" x ¼" sample is cut and mounted in a Tinius-Olsen Stiffness Tester, which measures the torsional modulus of plastic at various temperatures. The temperature at which a specimen has a torsional modulus of 135,000 lbs./sq. in., known as $T_f$ or $T_{135,000}$ is determined. This roughly corresponds to the "brittle point" obtained by cantilever apparatus.

Test 3.—Activated carbon volatility: 2" squares of weighed specimens are placed between 2-inch layers of activated carbon in sealed glass jars which are maintained at 90° C. for 24 hours. The specimens are removed, dusted free of carbon and reweighed.

Test 4.—Soapy water extraction: 3" squares of weighed specimens are immersed in a 1% aqueous solution of Ivory soap at 90° C. for 24 hours, after which they are thoroughly washed, dried, and reweighed.

Test 5.—Hexane extraction: Weighed samples are immersed in white, lead-free hexane at 25° C. for two hours, after which they are thoroughly dried and reweighed.

The performance data of the polyvinyl chloride compositions are represented in Table III; except for the results of Test 1, which are expressed in units of 1 to 100 and those of Test 2 which are stated in degrees centigrade; all other results are expressed as percentage loss of weight of the polyvinyl halide film, the test numbers corresponding to those given above.

Table II
KEY OF PLASTICIZERS

| Name of compound: | Code number |
|---|---|
| Naphthenyloxy butyl 19,10-epoxystearate | 1 |
| 4-(2-methylvaleryloxy)butyl naphthenate | 2 |
| 2-naphthenyloxymethyl-2 - heptanoyloxy methyl propyl 9,10-epoxystearate | 3 |
| Di(2-ethylhexyl)phthalate | 4 |

Table III
PERMANENCE DATA

| Compounds | 1 | 2 | 3 | 4 |
|---|---|---|---|---|
| Tests: | | | | |
| 1 | 73 | 71 | 74 | 69 |
| 2 | −34 | −38 | −30 | −34.5 |
| 3 | 1.3 | 7.8 | 1.0 | 10.3 |
| 4 | 1.7 | 10.0 | 0.3 | 10.6 |
| 5 | 35.0 | 31.3 | 35.5 | 29.1 |

The data demonstrate that typical naphthenic acid esters of this invention give resinous compositions with low volatility at elevated temperatures, and very satisfactory general plasticization properties.

Other well plasticized polyvinyl chloride resins are obtained by incorporating therein the following mixed esters:

Naphthenyloxy pentyl 9,10-epoxystearate,
2-naphthenyloxy-2-heptanoyloxy methyl propyl 9,10-epoxystearate,
2-ethylbutyryloxy naphthenate,
3-capryloxy propyl naphthenate, and
4-isocapryloxy butyl naphthenate.

In the above formulations, polyvinyl chloride is replaced by copolymers of (A) 87 parts: vinyl chloride
    13 parts: vinyl acetate,
(B) 80 parts: vinyl chloride
    20 parts: vinylidene chloride,
(C) 80 parts: vinyl chloride
    20 parts: methyl acrylate, and
(D) 95 parts: vinyl chloride
    5 parts: vinyl isobutyl ether.

The polyvinyl chloride copolymer compositions are tested as described above. All compositions are supple and flexible and they exhibit improved permanence over resinous compositions plasticized with di-(2-ethylhexyl)-phthalate.

I claim:
1. A plasticized resinous composition comprising a polymer selected from the group consisting of homopolymers of vinyl chloride and copolymers of vinyl chloride with an ethylenically unsaturated monomer copolymerizable therewith, said copolymer containing at least about 60% by weight of combined vinyl chloride, and said plasticized resinous composition having incorporated therein a plasticizing amount of a mixed ester composition consisting essentially of a mixed ester of a saturated aliphatic polyhydric alcohol esterified with naphthenic acid and an epoxidized fatty acid of 12 to 24 carbon atom content, said polyhydric alcohol having at least 2 and no more than 3 hydroxyl groups, the naphthenic acid and epoxidized fatty acid residues in the ester composition being present in the mole ratio of between 1 to 4 and 4 to 1.

2. The plasticized resinous composition of claim 1 in which the polymer is a homopolymer of vinyl chloride.

3. The plasticized resinous composition of claim 1 in which the polymer is a copolymer of vinyl chloride with an ethylenically unsaturated monomer copolymerizable therewith.

4. A plasticized resinous composition comprising a polymer selected from the group consisting of homopolymers of vinyl chloride and copolymers of vinyl chloride with an ethylenically unsaturated monomer copolymerizable therewith, said copolymer containing at least about 60% by weight of combined vinyl chloride, and said plasticized resinous composition having incorporated therein a plasticizing amount of 2-naphthenyloxymethyl-2-heptanoyloxymethylpropyl 9,10-epoxystearate.

5. A plasticized resinous composition comprising a polymer selected from the group consisting of homopolymers of vinyl chloride and copolymers of vinyl chloride with an ethylenically unsaturated monomer copolymerizable therewith, said copolymer containing at least about 60% by weight of combined vinyl chloride, and said plasticized resinous composition having incorporated therein a plasticizing amount of naphthenyloxybutyl 9,10-epoxy-stearate.

6. A plasticized resinous composition comprising a polymer selected from the group consisting of homopolymers of vinyl chloride and copolymers of vinyl chloride with an ethylenically unsaturated monomer copolymerizable therewith, said copolymer containing at least about 60% by weight of combined vinyl chloride, and said plasticized resinous composition having incorporated therein a plasticizing amount of naphthenyloxypenyl 9,10-epoxystearate.

References Cited by the Examiner
UNITED STATES PATENTS

| | | | |
|---|---|---|---|
| 2,017,070 | 10/35 | Lazier | 260—31.6 |
| 2,438,753 | 3/48 | Kellog | 260—31.6 |
| 2,891,089 | 6/59 | Jolly | 260—31.6 |
| 2,924,582 | 2/60 | Mullins et al. | 260—30.4 |
| 2,978,463 | 4/61 | Kuester et al. | 260—348 |
| 3,004,946 | 10/61 | Jolly | 260—31.6 |
| 3,054,765 | 9/62 | Van Hook | 260—31.6 |
| 3,069,377 | 12/62 | Wilbur | 260—30.4 |
| 3,074,973 | 1/63 | Phillips et al. | 260—348 |

OTHER REFERENCES

Fieser et al.: Organic Chemistry, 2nd Edition, Reinhold Publishing Corp., New York, pages 91 and 92.

ALEXANDER H. BRODMERKEL, *Primary Examiner.*
MORRIS LIEBMAN, *Examiner.*